(12) United States Patent
Sternberg

(10) Patent No.: US 6,606,487 B2
(45) Date of Patent: Aug. 12, 2003

(54) AUTOMATIC FREQUENCY CORRECTION METHOD AND APPARATUS FOR TIME DIVISION DUPLEX MODES OF 3G WIRELESS COMMUNICATIONS

(75) Inventor: Gregory S. Sternberg, Great Neck, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 10/256,734

(22) Filed: Sep. 27, 2002

(65) Prior Publication Data

US 2003/0064693 A1 Apr. 3, 2003

Related U.S. Application Data

(60) Provisional application No. 60/325,505, filed on Sep. 28, 2001.

(51) Int. Cl.$^7$ .................................................. H04B 7/00
(52) U.S. Cl. ........................ 455/257; 455/255; 375/344
(58) Field of Search ................................ 455/255, 256, 455/259, 260, 264, 422, 257; 375/343, 344, 345

(56) References Cited

U.S. PATENT DOCUMENTS 5,684,836 A * 11/1997 Nagayasu et al.
6,181,923 B1 * 1/2001 Kawano et al.

* cited by examiner

*Primary Examiner*—Thanh Cong Le
*Assistant Examiner*—Huy D Nguyen
(74) *Attorney, Agent, or Firm*—Volpe and Koenig, P.C.

(57) ABSTRACT

Method and apparatus for detection and correction of oscillator frequency error within a wireless communication system receiver. A frequency estimation having block correlators, conjugate product and sum, accumulation block, multipath detection and a loop filter-(accumulate block) (adaptive bandwidth). The multipath detection includes a search block, threshold detection block and a block for combining multipath components. The frequency difference attained between a base station (BS) local oscillator (LO) and a user equipment (UE) local oscillator is such that the UE LO does not deviate more than 0.1 PPM from the BS LO.

43 Claims, 6 Drawing Sheets

AUTOMATIC FREQUENCY CORRECTION METHOD AND APPARATUS FOR TIME DIVISION DUPLEX MODES OF 3G WIRELESS COMMUNICATIONS

CROSS REFERENCE TO RELATED APPLICATION

This application claims priority from U.S. provisional application No. 60/325,505, filed Sep. 28, 2001, which is incorporated by reference as if fully set forth.

FIELD OF INVENTION

The present invention relates to the field of wireless communications. More specifically, the present invention relates to the field of third generation 3G wireless communications employing Time Division Duplex (TDD) and to frequency error detection and correction within a wireless communication system receiver.

BACKGROUND OF THE INVENTION

In typical wireless communications systems, a frequency difference between the transmitter and receiver local oscillators can prevent the transmission of data. Additionally, because many systems utilize the same Local Oscillator (LO) for both receiver and transmitter functions, a large frequency offset can cause significant out-of-band interference.

In order to overcome this problem, prior systems have utilized differential detection of phase or applied the Discrete Fourier Transform to estimate the frequency error and apply an update to the Local Oscillator. However, these prior systems either ignored the effects of multipath interference or combined the AFC with a RAKE receiver. Therefore, these prior techniques were not applicable for systems that use Multi-user Detection without a RAKE receiver.

SUMMARY OF THE INVENTION

The present invention enables detection and correction of the oscillator frequency error within a wireless communication system receiver. Moreover, the present invention provides robust performance in the presence of multipath interference. Furthermore, the present invention overcomes the interference problem as well as exploiting the diversity gains associated with large delay spread. Additionally the inventor provides the capability of rejecting inter-cell and intra-cell interference sources, while operating effectively in the presence of both RF carrier offset and sampling clock offset. Also, the present invention has adaptive tuning speed and functions with systems using Multi-user Detection algorithms without RAKE receivers and can operate on a discontinuous pilot (training) signal.

The present invention includes a frequency estimator having block correlators, conjugate product and sum block, accumulation block, multipath detection and a loop filter (adaptive bandwith). The multipath detection includes a search block, threshold detection block and a block for combining multipath components.

BRIEF DESCRIPTION OF THE DRAWINGS

The present invention will be understood from the following description and drawings in which like elements are designated by like numerals and, wherein.

DETAILED DESCRIPTION OF THE INVENTION

Figure 1:
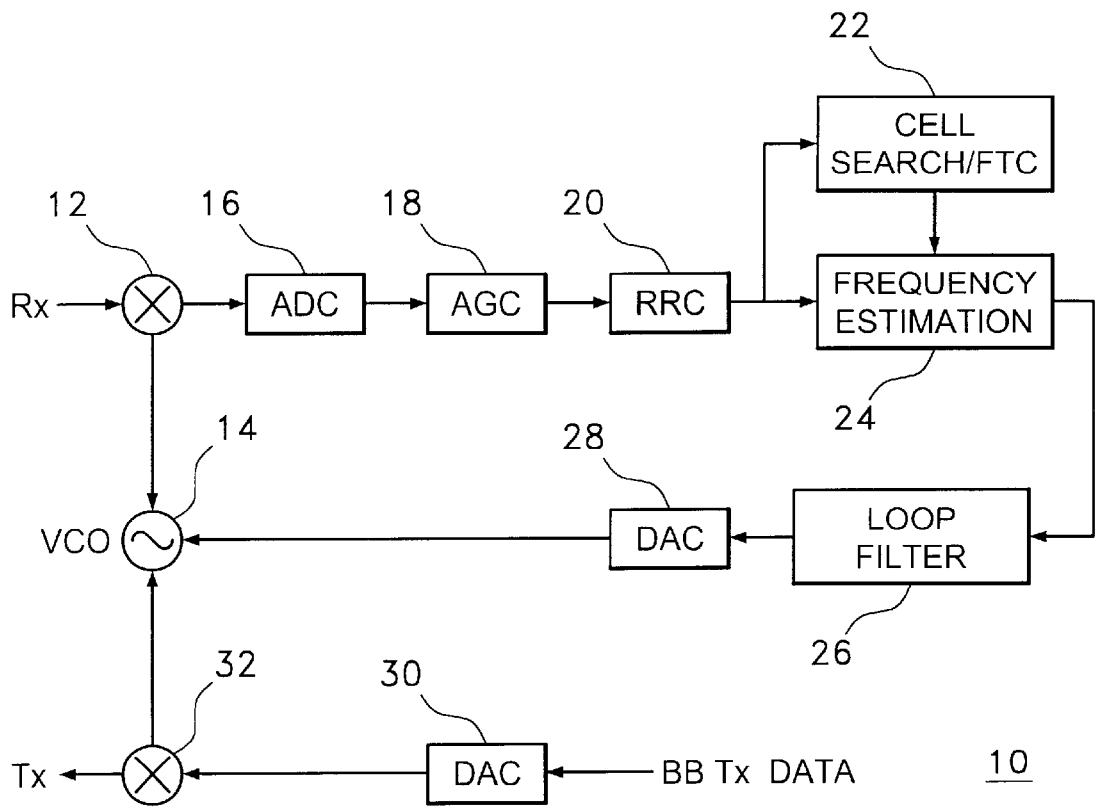
FIG. 1 is a block diagram of a automatic frequency control (AFC) algorithm employing the technique of the present invention.

FIG. 1 is a block diagram of the closed loop automatic frequency control (AFC) 10 wherein a received signal Rx is reduced to baseband at multiplier 12 by a voltage controlled oscillator (VCO) 14. The received baseband signal Rx undergoes analog-to-digital conversion (ADC) at 16, automatic gain control (AGC) at 18 and then passes through a root-raised cosine (RRC) filter 20.

After cell search at 22 and frequency estimation at 24, the frequency estimate is applied to loop filter 26. This digital output is converted by digital-to-analog converter (DAC) 28 to adjust the frequency of VCO 14, which is also used for transmission wherein baseband (BB) Tx data is converted by digital-to-analog converter (DAC) 30 which is used to modulate the carrier frequency provided by VCO 14 at multiplier 32.

Figure 2:
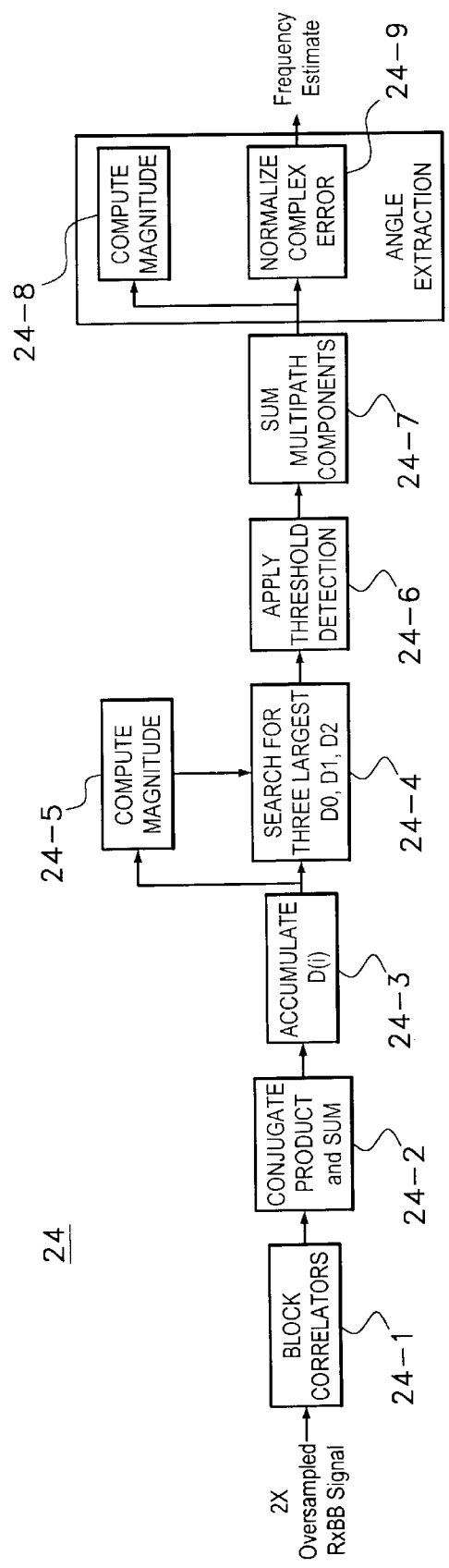
FIG. 2 is a block diagram illustrating the frequency estimation algorithm of the present invention.

FIG. 2 is a block diagram showing the steps that are performed by frequency estimation block 24 and which shows the frequency estimation algorithm in greater detail.

Initially, the frequency estimation algorithm performs four (4) block correlations of the received signal samples with a known reference (midamble) at 24-1. The output of the four (4) block correlators, at 24-2 are successively multiplied in the conjugate sense to produce three (3) complex numbers with angles representative of the phase shift, in time, from one correlator to the next. These three conjugate products are then summed together to produce a lower variance estimate of the phase change. The output of the accumulate block 24-3 is a function of window lag, i, the value being accumulated over N frames. After N frames of data have been processed, the accumulated D(i) (values) are searched for the three values that have the largest absolute value, D0 (largest), D1 and D2, at 24-4. Magnitudes of these values are computed at 24-5 in order to obtain the three largest D(i) values.

A detection threshold is then applied at 24-6 which threshold is based on the magnitude of the peak value (D0). If the magnitude of the second and third largest components exceed this threshold they are deemed sufficiently large to be included in the frequency estimation computation.

After the threshold detection is performed, the surviving multipath components are then coherently summed at 24-7 to provide a single complex number whose angle may be used as an estimate of the phase change between correlator blocks. The frequency estimate is computed, employing blocks 24-8 and 24-9, which utilize two (2) approximations, to be described hereinbelow, avoiding the need for explicit trigonometric calculation.

Figure 3:
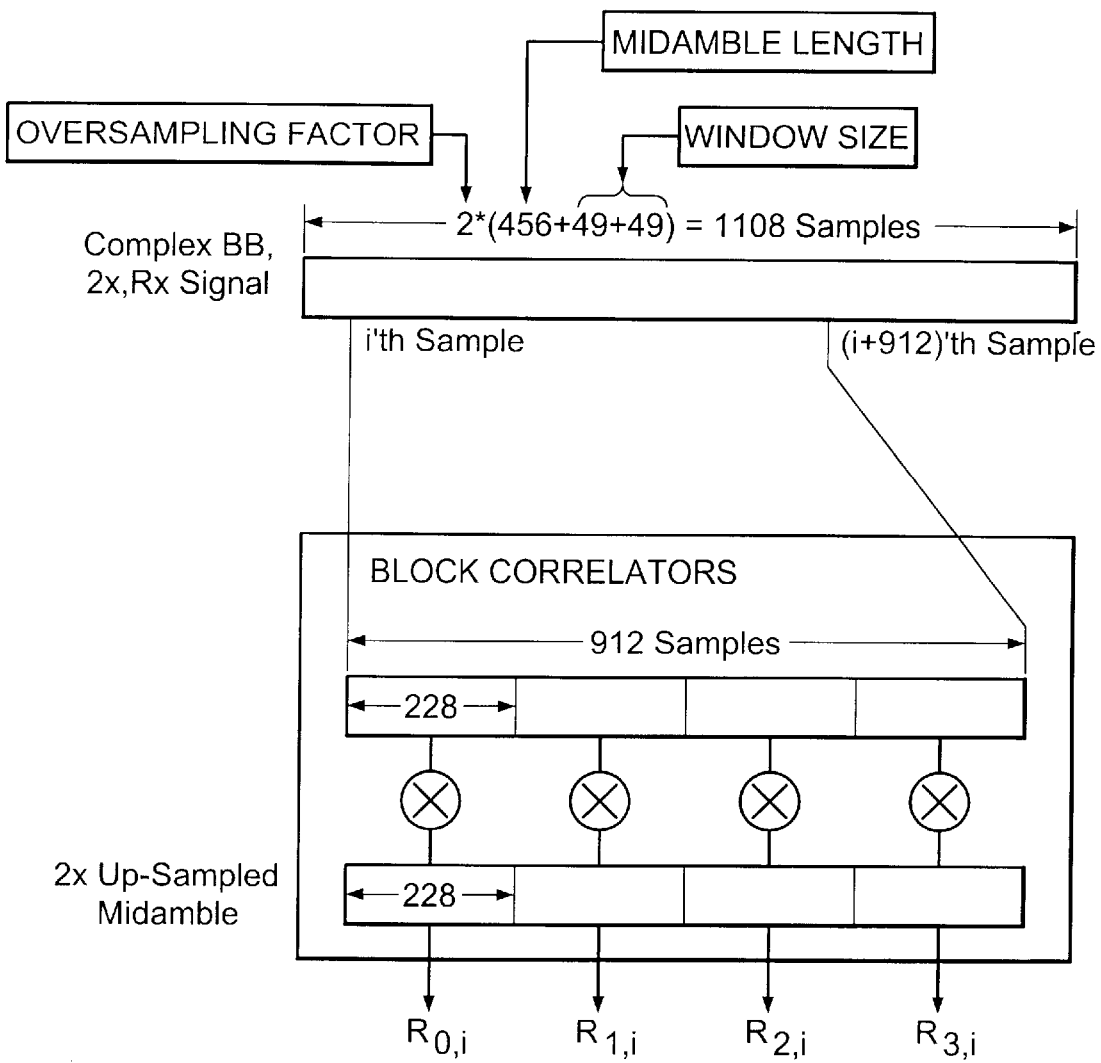
FIGS. 3 and 4 are schematic diagrams which illustrate the structure included in each block correlator of FIG. 2.

FIG. 3 shows the sliding window block correlation operation. Due to possible corruption of the first portion of the midamble with multipath interference from the first data burst, the last 456 chips of the midamble are utilized in the frequency estimation. The window that is searched includes 49 leading, 49 lagging and the 0 lag alignments, the total number of samples executed by the sliding window block correlator being 1108. In a 3GPP TDD communications system, equal length frames of 10 ms are comprised of fifteen (15) equal length time slots each having 2560 chips.

At each lag the four B chip (2B sample) correlations are performed, as shown in FIG. 3.

Figure 4:
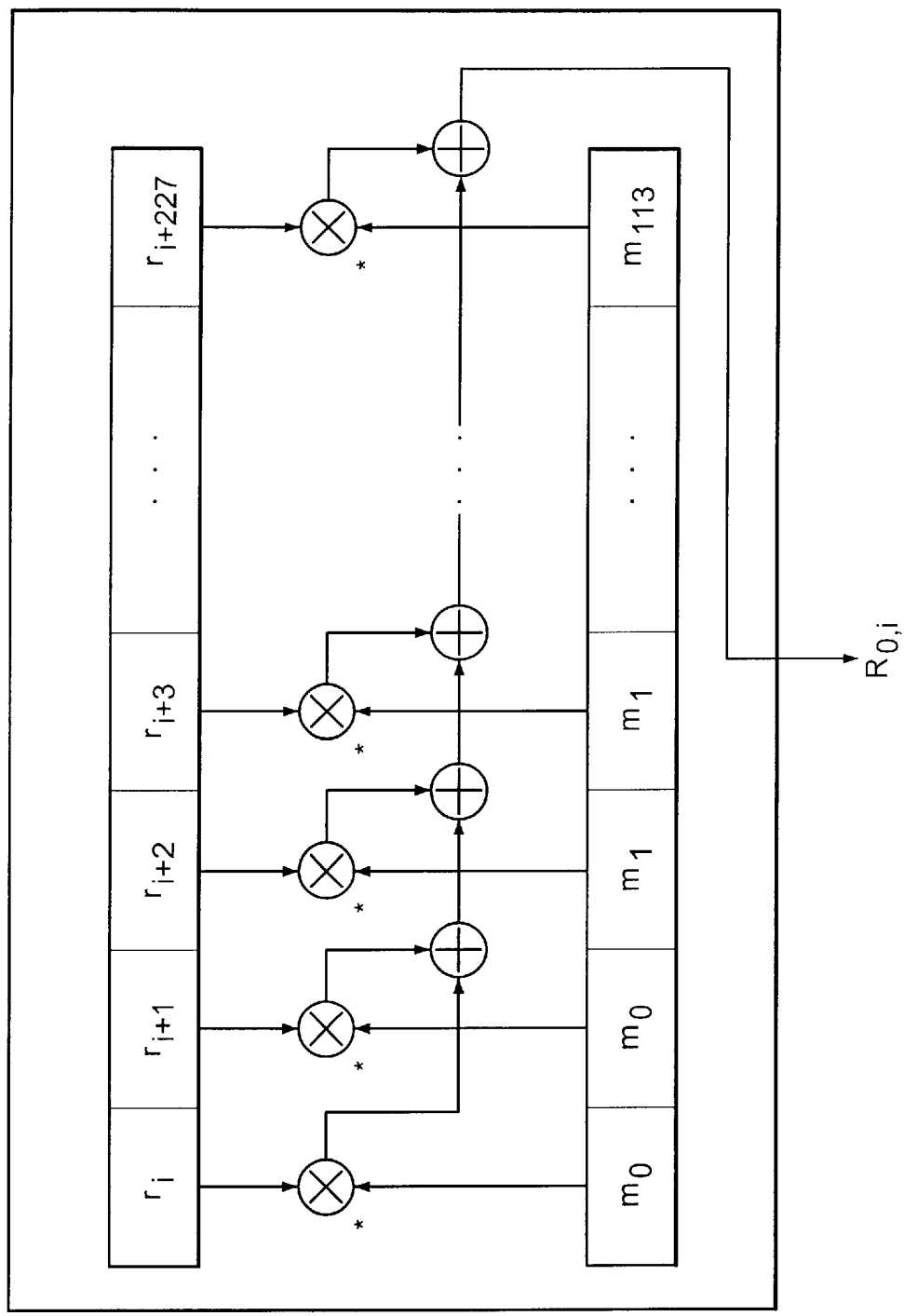

FIG. 4 shows the details of the first block correlator that produces Ro,i. As shown in FIG. 4, each received sample is correlated with a known midamble and summed with the next successive correlation.

Figure 5:
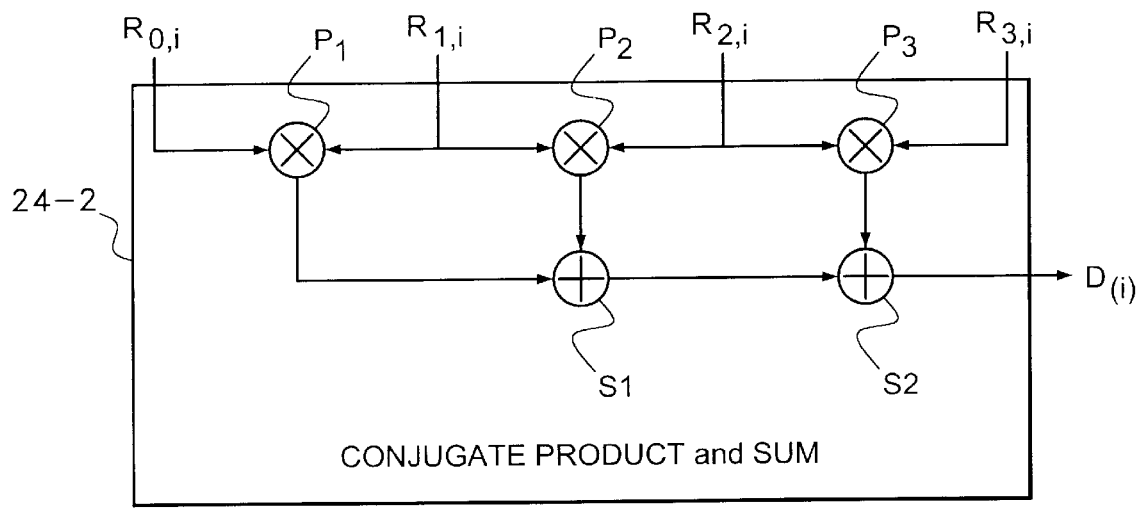
FIG. 5 is a schematic diagram showing the conjugate product and sum block of FIG. 2 in greater detail.

FIG. 5 shows the conjugate product and summation operation 24-2 which is performed on the outputs of the sliding block window correlators of block 24-1. The correlator outputs R are complex vectors representing the centroid of the received samples with the midamble modulation removed. The next step is estimating the phase change from one correlator to the next which is accomplished by computing a conjugate product of successive correlator outputs. Each output from a conjugate product operation is a complex vector whose angle approximates the phase change from the center of one correlation to the next. The three conjugate products developed by product circuits P1, P2 and P3 are summed together at S1 and S2 to produce a lower variance estimate of the phase change from one correlator to the next.

The D(i) values of the conjugate product and sum block 24-2 are accumulated over N midambles before computing a frequency estimate.

The accumulation time constant N is initialized to be 10 and is subsequently determined based on the most recent estimate of the absolute value of the frequency error. The value of N is selected to minimize the variance of the frequency estimate while preventing significant drift during the estimation interval.

After N midambles have been processed through the sliding window correlators 24-1, conjugate product, sum 24-2 and accumulator 24-3, a search is performed to find the lag, i, which maximizes the magnitude of $\overline{D}(i)$. Due to the fact that there may be multiple resolvable multipath components, the three (3) largest paths are sought, the number of paths sought being a compromise between additional signal-to-noise ratio (SNR) improvement and increased hardware complexity.

Since it is possible that there is only one resolvable multipath component available, the second (D1) and third (D2) largest components are tested for significance. D1 and D2 are considered significant if they are greater than half D0 in the magnitude square sense. Thus D1 and D2 are accepted it if they are greater than D0 divided by the square root of 2 (D0/$\sqrt{2}$) and rejected if otherwise.

The multipath components meeting the above requirements are then combined into a single complex vector at 24-7, whose angle is an estimate of the phase change of the carrier offset over one block time.

In order to extract angle information from the multipath combiner output, the complex variable is scaled to unit magnitude and an approximation of the complex absolute value function is utilized, the approximation being that the imaginary part of the complex vector is equal to the argument of the complex vector which is equal to θ, if θ is much less than 1 (θ<<1) and the absolute value of the complex vector is 1.

This approximation simplifies the implementation of the algorithm, alleviating the need to perform trigonometric computations and it has been found that the error introduced by the approximations tends to zero as the AFC algorithm converges (θ→1).

Loop filter 26 takes the estimated frequency error $\epsilon$ and performs an integration operation in order to obtain v(t) which is represented as: v(t)=v(t−1)+λ$\epsilon$(t).

Figure 6:
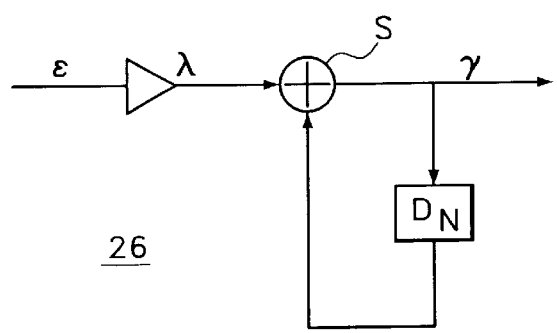
FIG. 6 is a schematic diagram showing the details of the loop filter block of FIG. 1.
Figure 7:
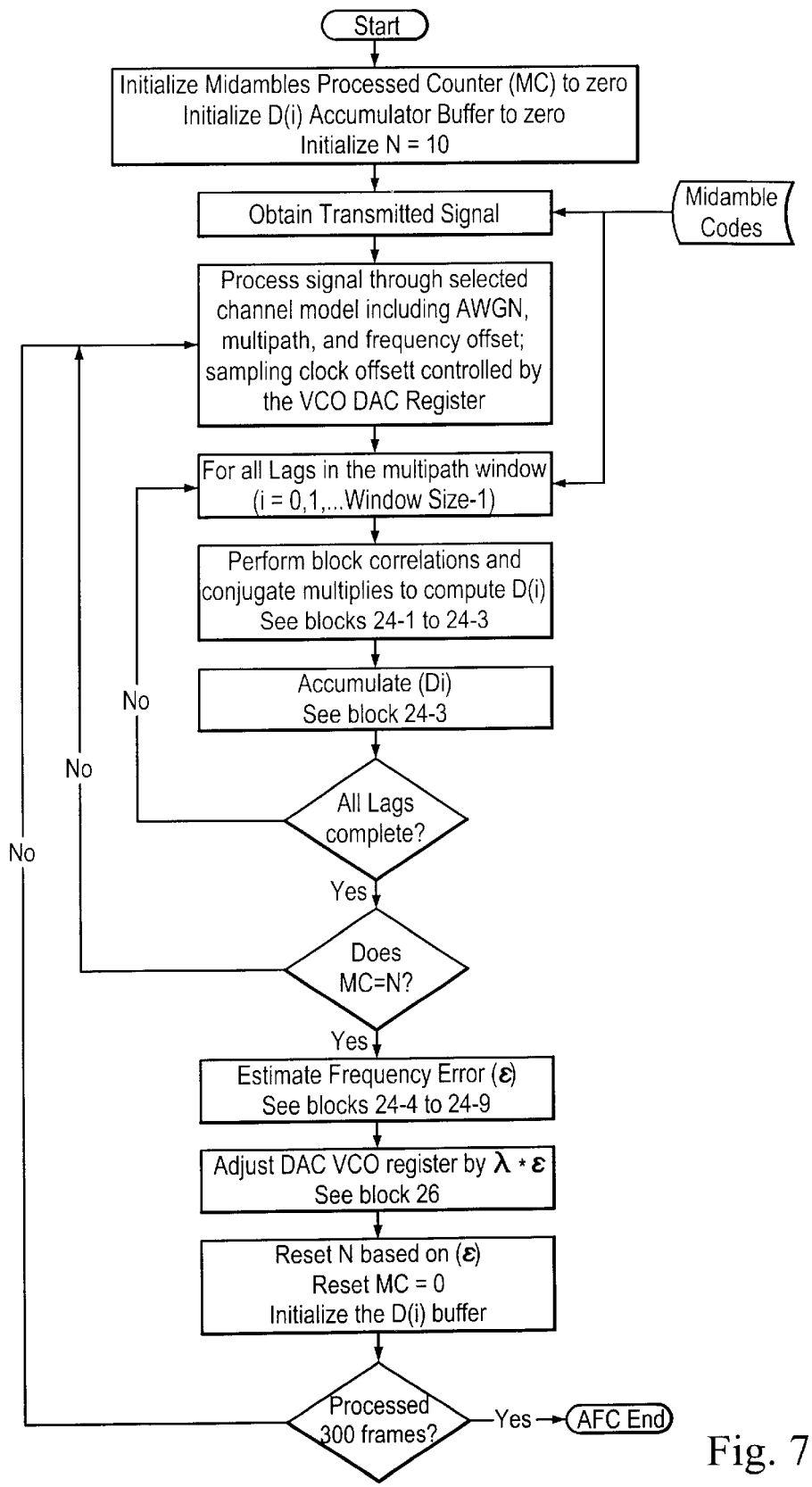
FIG. 7 is a flow diagram showing the algorithm performed by the apparatus of FIG. 2.

This is also depicted in FIG. 6 wherein input $\epsilon$ is applied to an amplifier having a gain of −1 and summed with the previous value v(t−1) obtained at $D_N$, at summer S.

It should be noted that the integration is performed only when the error $\epsilon$ is dumped from the previous block. Therefore, the value of v changes after N midambles are processed. A convergence detection algorithm (CDA) may be employed to determine convergence.

One technique is to compare the frequency estimate generated at the output of 24-9 against a threshold and if the estimated frequency error is smaller than |α|, convergence has been reached. The algorithm is considered memoryless because convergence is based only on the current estimate of frequency error.

An alternative arrangement is to declare convergence when two (2) successive frequency estimates are below a detection threshold α. Alternatively, the two frequency estimates need not be successive.

In still another alternative, convergence is detected based on a two-point moving average of frequency estimates powering below a detection threshold α by successively averaging the last two frequency estimates obtained at 24-9 and comparing them against a threshold.

Regarding the detection threshold optimization employed by block 24-6, based on tests performed, an optimal choice of relative detection threshold is 0.56 (i.e. 0.56D(o)) which provides an improvement in the probability of p=0.99 in a convergence time of 0.65 seconds.

The optimum choice of loop gain λ is dependent upon the SNR and channel conditions. The optimal choice for loop gain is 0.26 which provides a significant improvement and success probability for the AWGN channel with an SNR of −3 dB and two (2) active midambles.

In order to prevent the loss of coherency during the accumulation interval the relationship between N and estimated frequency error has been adjusted. The enhanced values prevent the drift of the clock from exceeding 0.25 chips over the accumulation periods, the value of N varies from 1 to 30 as a function of absolute frequency error of 6,000 to 0, the lower the absolute frequency error, the higher the number N of midambles accumulated.

Based on a comparison of the use of 456 versus 512 chips of the midamble in the correlation stage wherein the elimination of the first 56 chips of the received midamble which may be corrupted by multipath interference of the first data burst is offset by a reduction SNR of about 0.5 dB, it has been determined that for all 3 WG4 test channels, the use of all 512 chips of the midamble is desirable. In a burst type 1, for example, each time slot has two (2) groups of data symbols, each having 976 chips separated by a 512 chip midamble and a 96 chip guard period following the last group of the two (2) groups of data symbols.

Previously, the window searched is described as including 49 leading, 49 lagging and no (i.e. 0) lag alignments. A more reasonable leading path search was determined to be 10 chips making the total number of samples required for the sliding window block correlator to execute as being 1142 samples, which reduction in window size is still acceptable for the worst case multipath WG4 channel model (case 2) in which the largest resolvable path is 46Tc delayed relative to the direct path.

An approach to multipath combining employed in blocks 24-6 and 24-7 in which the largest path D0 is twice the weight of the second largest when only two paths survive, has been compared with a multipath combiner that treats the two surviving paths with equal gain and it has been found that equal gain combining resulted in slightly better performance in the WG4 case 1 and essentially the same performance for the other cases and hence is the preferred approach where only D(0) and D(1) are to be combined.

The present invention can also be implemented using an alternative method of estimating the phase difference (based on a plurality of multipath components). In this case the phase estimation will still include a quality measure similar to the correlation magnitude used in the invention.

The same approach used to adjust the accumulation period (adaptive tuning rate) could be applied to the correlation block size. For large frequency offsets, smaller correlation block sizes are preferable because of the possibility of aliasing and the loss of coherency in the estimate. As the frequency error diminishes, the correlation block size could be increased to improve the processing gain of the correlation and obtain more refined estimates of frequency error.

What is claimed is:

1. A method for obtaining a frequency estimate to adjust a local oscillator, comprising:
   a) receiving a communication signal comprised of time slots containing data symbols and a midamble;
   b) performing a given number N of block correlations of the received signal samples with a known midamble reference;
   c) forming a conjugate product of the N block correlations to form N−1 conjugate products;
   d) forming a sum of the N−1 conjugate products;
   e) accumulating a given number of sums of said N−1 conjugate products obtained at step (d);
   f) determining the magnitudes of each accumulated value;
   g) searching for a given number of largest values;
   h) applying a threshold detection of the given number of largest values other than the largest value employing a threshold which is a function of the largest value;
   i) combining the largest value with those of the given number of largest values other than the largest value and which are greater than the aforesaid threshold;
   j) computing the magnitude of the sum obtained in step (i);
   k) normalizing the complex value obtained in step (i) employing the magnitude obtained in step (j); and
   l) employing the argument of the normalized value obtained in step (k) as a frequency estimate.

2. The method of claim 1 further comprising:
   m) applying the frequency estimate obtained in step (l) to a loop filter for obtaining a voltage value adjusting the operating frequency of a voltage controlled oscillator.

3. The method of claim 2 wherein the frequency estimate obtained in step (m) is in a digital format and further comprising:
   (n) converting the digital format into an analog voltage.

4. The method of claim 3 further comprising:
   (o) applying the analog voltage to the voltage controlled oscillator.

5. The method of claim 1 wherein step (b) includes performing four (4) block correlations, i.e. where N=4.

6. The method of claim 1 wherein step (e) includes adjusting the number of sums accumulated based on the absolute frequency error wherein the smaller the frequency error, the smaller the number of sums accumulated.

7. The method of claim 6 wherein the absolute frequency error range is generally between 6,000 and 0 Hz.

8. The method of claim 7 wherein the number of sums accumulated is between 1 and 30.

9. The method of claim 1 wherein steps (f) through (l) are performed when the given number of accumulated sums is reached at step (e).

10. The method of claim 1 wherein the threshold employed in step (h) is between 0.707 and 0.56 times the largest D value.

11. The method of claim 1 wherein the received signal at step (a) has a midamble length of 512 chips, all of which are correlated at step (b).

12. The method of claim 1 wherein the midamble of the received signal at step (a) has a length of 512 chips and the first 56 chips are ignored in the performance of step (b).

13. The method of claim 1 wherein, in the event that only one path meets the aforesaid threshold of step (i), step (i) further includes combining the two paths with equal gain.

14. The method of claim 1 wherein convergence to the required accuracy in a given number of frames with a probability of 0.99 is determined by comparing the estimated frequency error with a threshold wherein convergence is obtained when the estimated frequency error lies below a given detection threshold.

15. The method of claim 1 wherein convergence to the required accuracy in a given number of frames with a probability of 0.99 is determined when two frequency estimates lie below a given detection threshold.

16. The method of claim 1 wherein convergence to the required accuracy in a given number of frames with a probability of 0.99 is determined when two successive frequency estimates lie below a given detection threshold.

17. The method of claim 1 wherein convergence to the required accuracy in a given number of frames with a probability of 0.99 is determined when a two-point moving average of frequency estimates drops below said detection threshold.

18. The method of claim 1 wherein a frequency offset is measured and the broadcast channel (BCH) is read when the frequency offset is less than 400 Hz.

19. The method of claim 18 further including preventing detection of the BCH when the absolute frequency offset threshold is equal to or greater than 465 Hz.

20. The method of claim 1 wherein loop gain of the loop filter lies between 01. and 0.3.

21. The method of claim 20 wherein the loop gain is preferably 0.26.

22. The method of claim 1 wherein the estimated angle θ is determined at step (i) by the equation $$\theta = \text{Im}\left\{\frac{D}{\text{Abs approx }\{D\}}\right\}.$$

23. The method of claim 1 wherein the loop filter generates a value v(t) where:

$$v(t)=v(t-1)+\lambda\epsilon(t),$$

and where v(t−1) is the previous estimate, $\epsilon$ is the frequency estimate and $\lambda$ is a constant.

24. The method of claim 1 wherein the communications system is a wireless communication system in which the received signal is comprised of a plurality of frames of equal length, each frame having a given number of time slots and each time slot having a given number of chips.

25. The method of claim 24 wherein each time slot has 2,560 chips comprised of first and second groups of data symbols separated by a midamble.

26. The method of claim 25 wherein said data symbol groups each have 976 chips, said midamble having 512 chips and the group of data symbols following the midamble is followed by a guard period of 96 chips.

27. The method of claim 1 wherein the given number of largest values searched for in step (g) is three (3).

28. The method of claim 1 wherein step (b) includes adjusting block correlation size based on frequency offsets wherein the larger the offset the smaller the block correlation size.

29. Apparatus for obtaining a frequency estimate to adjust a local oscillator, comprising:

means for receiving a communication signal comprised of time slots containing data symbols and a midamble;

means for performing a given number N of block correlations of the received signal samples with a known midamble reference;

means for forming a conjugate product of the N block correlations to form N−1 conjugate products;

means for forming a sum of the N−1 conjugate products;

means for accumulating a given number of sums of said N−1 conjugate products obtained from said sum forming means;

means for determining the magnitudes of each accumulated value;

means for searching for a given number of largest values;

means for performing a threshold detection of the given number of largest values other than the largest value employing a threshold which is a function of the largest value;

means for combining the largest value with the given number of the largest values other than the largest value and which are greater than the aforesaid threshold;

means for computing the magnitude of the sum obtained by said combining means;

means for normalizing the complex value obtained by said combining means employing the magnitude obtained by said computing means; and means for generating an argument of the normalized value obtained by said normalizing means for a frequency estimate.

30. The apparatus of claim 29 further comprising:

said generating means applying the frequency estimate to a loop filter for adjusting an operating frequency of a voltage controlled oscillator.

31. The apparatus of claim 30 wherein the means for generating the frequency estimate produces a digital formatted output and means for converting the digital formatted output into an analog signal applied to the voltage controlled oscillator.

32. The apparatus of claim 29 wherein the block correlating means includes means to perform four (4) block correlations.

33. The apparatus of claim 29 wherein the accumulating means includes means for adjusting the number of sums accumulated based on the absolute frequency error wherein the smaller the frequency error the smaller the number of sums accumulated.

34. The apparatus of claim 29 wherein the threshold value employed by said threshold detection means is between 0.707 and 0.56 times the largest D value.

35. The apparatus of claim 29 wherein the received signal has a midamble length of 512 chips, all of which are correlated by said correlation means.

36. The apparatus of claim 29 wherein means are provided to determine if only one path meets the aforesaid threshold provided by said threshold detection means and means responsive to said determining means for combining the two paths with equal gain.

37. The apparatus of claim 29 wherein convergence to the required accuracy in a given number of frames with a probability of 0.99 is determined by means for comparing the estimated frequency error with a threshold wherein convergence is obtained when the estimated frequency error lies below a given detection threshold.

38. The apparatus of claim 29 wherein convergence to the required accuracy in a given number of frames with a probability of 0.99 is determined by means for identifying convergence when two (2) frequency estimates lie below a given detection threshold.

39. The apparatus of claim 29 wherein convergence to the required accuracy in a given number of frames with a probability of 0.99 is determined by means for identifying convergence when two (2) successive frequency estimates lie below a given detection threshold.

40. The apparatus of claim 29 wherein convergence to the required accuracy in a given number of frames with a probability of 0.99 is determined by means for identifying convergence when a two-point moving average of frequency estimates is below said detection threshold.

41. The apparatus of claim 29 further comprising means for measuring a frequency offset is measured and means for reading a broadcast channel (BCH) when the frequency offset is less than 400 Hz.

42. The apparatus of claim 29 wherein said means for searching searches for the three (3) largest values.

43. The apparatus of claim 29 wherein the said performing means includes means for adjusting block correlation size based on frequency offsets wherein the larger the offset the smaller the block correlation size.

* * * * *

UNITED STATES PATENT AND TRADEMARK OFFICE
CERTIFICATE OF CORRECTION

PATENT NO.   : 6,606,487 B2
DATED        : August 12, 2003
INVENTOR(S)  : Gregory S. Sternberg It is certified that error appears in the above-identified patent and that said Letters Patent is hereby corrected as shown below:

Column 6,
Line 50, after the word "between," delete "01." and insert therefor -- 0.1 --.

Signed and Sealed this

Thirteenth Day of April, 2004

JON W. DUDAS
*Acting Director of the United States Patent and Trademark Office*